UNITED STATES PATENT OFFICE.

CARL HOEPFNER, OF FRANKFORT-ON-THE-MAIN, GERMANY.

PROCESS OF EXTRACTING ZINC FROM ITS ORES.

SPECIFICATION forming part of Letters Patent No. 629,686, dated July 25, 1899.

Application filed November 18, 1897. Serial No. 658,996. (No specimens.)

*To all whom it may concern:*

Be it known that I, CARL HOEPFNER, residing at Frankfort-on-the-Main, in the German Empire, have invented certain new and useful Improvements in Processes of Extracting Zinc from its Ores, (for which Letters Patent have been obtained in England, dated November 3, 1896, No. 24,573;) and I do hereby declare the following to be a full, clear, and exact description of the invention, such as will enable others skilled in the art to which it appertains to make and use the same.

This invention has for its object a process of extracting zinc, or zinc and other metals, from pure or complex zinciferous minerals, as calamine or sulfidic zinc ores also containing lead, silver, iron, or other metals, like the ores of Brokenhill, in New South Wales, and of Leadville, Colorado.

In carrying out my invention I first roast the ore, calamine of course excepted when this is the primary material, the sulfurous-acid gases evolved being preferably collected and converted in the usual manner into common sulfuric acid for use in the process. The crude sulfuric acid so obtained and containing much water is then caused to react upon a cheap chlorid, as sodium or potassium chlorid, and heated to produce gaseous hydrochloric acid and an alkali sulfate. Of course the crude sulfuric acid may be derived from other sources than the roasting of these ores. The gaseous hydrochloric acid containing much water in the form of steam originating from the crude sulfuric acid is then brought into contact with the oxidized ore previously mixed with water or preferably with the chlorid solution derived from the previously-treated ores, and while being stirred the zinc oxid in the ore is converted into chlorid in accordance with the following equation:

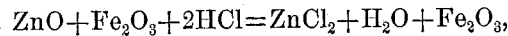

$$ZnO + Fe_2O_3 + 2HCl = ZnCl_2 + H_2O + Fe_2O_3,$$

the iron remaining practically undissolved. Inasmuch as it is not expedient to free the raw material at once and completely from its metallic constituents I resort to the so-called "methodical" extraction and cause the fresh acid solution to react first upon a material that has previously been partially freed from its metal, so that I am enabled to extract the last traces of zinc, whereby some of the oxid of iron will or may be dissolved out at the same time. The solution so obtained containing less free acid and some dissolved oxid of iron is then used to react upon raw materials—*i. e.*, materials containing zinc in excess. In this manner the perchlorid of iron formed by the reaction of an excess of hydrochloric acid upon the partially-exhausted material or oxidized zinc ore formed by addition of free chlorin, in case the solution contains the ferrous salts, will, together with the hydrochloric acid, dissolve the remaining oxid and sulfids of zinc, lead, copper, and silver. This reacting solution will by contact with the fresh warm roasted zinc ore readily yield up its free acid, as well as most of its iron, so that substantially the whole of the hydrochloric acid is utilized. The final residuary ore is washed with warm water or with a warm chlorid solution to remove any remaining lead chlorid. I thus obtain a neutral or slightly-basic final solution of chlorid of zinc containing also the other valuable metals extracted from the ore. From this solution the metals more electronegative than zinc, as the lead, silver, &c., are precipitated one after another or simultaneously by well-known means, as by refrigeration, by electrolysis, or with metallic lead and zinc, or with sulfids, oxids, carbonates, chromates, or other suitable precipitants, though I prefer to extract these more electronegative metals electrolytically with a low current density in order not to precipitate the zinc, because I am thus assured of a purer zinc chlorid solution. After the extraction of the metals referred to traces of the remaining iron and manganese are precipitated by means of chlorid of lime or other suitable precipitant, as chlorin, with hydrate of lime or hydrate of zinc, and finally the zinc in the solution extracted electrolytically, thereby producing pure metallic zinc and chlorin. The solution, partially freed from zinc, or so as to contain not more than from one to three per centum of the metal, is used over and over again for the absorption of hydrochloric-acid gas and the treatment of fresh quantities of mineral and subsequent purification and electrolysis. In this repeated process of extraction and electrolysis the solutions after awhile become very much diluted by the condensation of hydrochloric acid and steam; but this can be remedied by concentrating the dilute solutions by evaporation of the water. The steam required for working the sulfuric-acid chambers or other acid-producer may thus be conveniently derived from the operation of concentration of these weak solutions, or such steam may be economically derived from the exhaust-steam freed from oil from the engine or engines that drive the dynamos and other machinery used in the process, whereby a material reduction in expense is effected. The sulfates of the alkalies are also available as a source of profit, as there is generally a good demand for sulfate of sodium and of potassium as a fertilizer.

Before roasting the sulfidic ores they can be treated with hot solutions of acids, as hydrochloric acid, or with solutions of salts, as cupric chlorid or perchlorid of iron, for the purpose of extracting the silver and lead or part of the latter, which when present in great quantities is known to be inconvenient in the process of roasting. ($ZnS + PbS + 2CuCl_2 = Cu_2Cl_2 + PbCl_2 + S + ZnS$.)

The solution to be electrolyzed should contain a sufficiency of sodium or potassium or calcium or magnesium chlorid to insure good conductivity.

The described process of making use of hydrochloric acid to produce chlorin by electrolyzing the zinc-chlorid solution is far more economical than the Weldon and Deacon processes, because I produce two products, zinc and chlorin. It is obvious that the hydrochloric acid obtained by the Hargreaves process may likewise be used in the manner described, and the steam required in this process may likewise be derived from the operation of concentration of weak or dilute zinc-chlorid solutions, or the exhaust-steam from the engine or engines after being freed from impurities, as lubricant, may be used.

Should the ore to be treated, especially calamine, contain much calcium and magnesium, a portion of the hydrochloric acid will be converted into calcium or magnesium chlorid, which are vailable in the production of zinc-chlorid solutions, as described in my application for patent of even date with this, Serial No. 658,995, filed November 18, 1897.

Having thus described my invention, what I claim as new therein, and desire to secure by Letters Patent, is—

1. The process, which consists in mixing a material containing zinc in the form of an oxygen compound, with a metallic-chlorid solution, and reacting upon the mixture with hydrochloric-acid gas, whereby a neutral or slightly-basic solution containing zinc in the form of chlorid is obtained, and recovering the metal from said solution.

2. The process, which consists in roasting a zinciferous sulfidic material to convert the zinc into an oxid, converting the resulting sulfurous acid into sulfuric acid, causing the latter to react upon a suitable chlorid in presence of heat and reacting with the hydrochloric acid thus formed upon the oxidized material in the presence of a metallic-chlorid solution whereby a neutral or slightly-basic solution containing zinc in the form of a chlorid is obtained, and recovering the zinc from said solution, substantially as set forth.

3. The process, which consists in oxidizing roasting a zinciferous sulfidic material, converting the resulting sulfurous acid into sulfuric acid, causing the latter to react upon a suitable chlorid in the presence of heat and reacting with the hydrochloric-acid gas thus formed upon the oxidized material in the presence of a metallic-chlorid solution, whereby a neutral or slightly-basic solution containing zinc in the form of a chlorid is obtained, and electrolyzing the latter solution, substantially as described.

4. The process which consists in reacting with hydrochloric-acid gas, in the presence of a metallic-chlorid solution, upon a material containing an oxygen compound of zinc, whereby a neutral or slightly-basic solution containing zinc chlorid is obtained, eliminating the metal or metals more electronegative than zinc from said solution, removing the iron, electrolytically extracting most of the zinc, and returning the impoverished electrolytic solution into the cycle of operations, as set forth.

5. The process which consists in reacting with hydrochloric-acid gas, in the presence of a metallic-chlorid solution, upon a material containing an oxygen compound of zinc, whereby a neutral or slightly-basic solution containing zinc chlorid is obtained, eliminating the metal or metals more electronegative than zinc from said solution by successively-rising current densities, removing the iron, electrolytically extracting most of the zinc, and returning the impoverished electrolytic solution into the cycle of operations, as set forth.

6. The process which consists in reacting with hydrochloric-acid gas, in the presence of a metallic-chlorid solution at a temperature above normal upon a material containing an oxygen compound of zinc, whereby a neutral or slightly-basic solution is obtained, recovering the lead by suitable means and the other metals more electronegative than zinc electrolytically by using successively-increasing current densities, and finally the zinc, and then returning the impoverished electrolyte into the cycle of operations, substantially as set forth.

7. The process which consists in reacting upon a crude zinciferous sulfid mineral containing also other metals, as lead and silver with a suitable chlorid solution, as cupric chlorid or perchlorid of iron, thereby extracting a portion of the lead removing such solution, roasting the mineral thus partly freed from lead, and then reacting thereon with hydrochloric-acid gas in presence of water or a chlorid solution, whereby certain metals, as lead and silver are first extracted from the crude ores and subsequently a final solution obtained containing the zinc in the form of chlorid, substantially as and for the purpose set forth.

In testimony that I claim the foregoing as my invention I have signed my name in presence of two subscribing witnesses.

CARL HOEPFNER.

Witnesses:
 HENRY ORTH, Jr.,
 HENRY ORTH.